(No Model.)

E. R. MILTENBERGER.
CULTIVATOR.

No. 344,001. Patented June 22, 1886.

WITNESSES

E. R. Miltenberger
INVENTOR

Jno. Ambler Smith
Attorney

UNITED STATES PATENT OFFICE.

EMILE RUDOLPH MILTENBERGER, OF CUERO, TEXAS.

CULTIVATOR.

SPECIFICATION forming part of Letters Patent No. 344,001, dated June 22, 1886.

Application filed October 21, 1885. Serial No. 180,512. (No model.)

*To all whom it may concern:*

Be it known that I, EMILE RUDOLPH MILTENBERGER, a citizen of the United States, residing at Cuero, in the county of De Witt and State of Texas, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of inventions known as "garden-cultivators;" and it consists in the details of construction hereinafter more fully set forth, and specifically pointed out in the claims.

Figure 1:
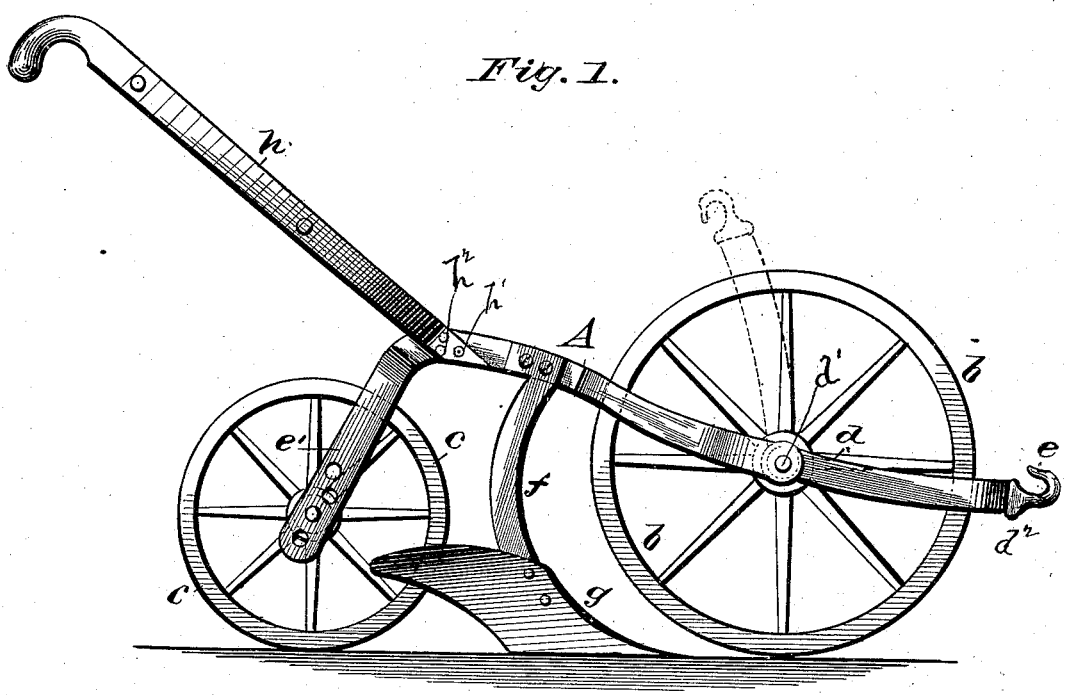
Figure 2:
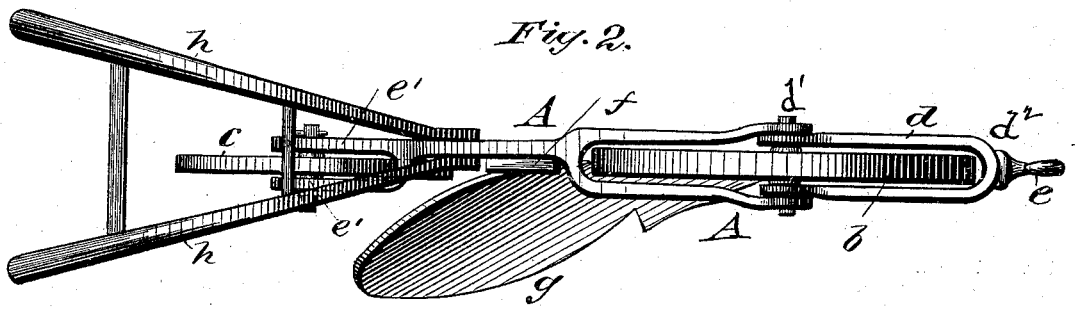

Figure 1 represents a perspective view of my improvement. Fig. 2 represents a top plan view of the same.

In the annexed drawings, A represent the frame having at its front a wheel, $b$, and at the rear, directly behind wheel $b$, is another wheel, $c$, of smaller diameter. The front wheel, $b$, and rear wheel, $c$, run between the beams, which are made double to admit of the wheels and project sufficiently for the reception of a bolt. To the front part of the beam is attached a clevis, $d$, secured on the axle by any well-known means, and on the end of said clevis is a hook, $e$, for hand or horse draft attachment. The clevis $d$ may be thrown back upon the beam when desired. The arm $f$, to which is attached the plow $g$, is made to curve slightly under the beam to be even with the rest of the plow. The handles $h\ h$ are attached to the frame A by bolt $h'$ at the extreme end thereof, and at a short distance back there are two bolts made adjustable, as seen at $h^2$, for the purpose of lowering or raising the handles.

The plow may be run deep or shallow by the adjustment of the main arm A or gage $e$, by which the plow is easily and quickly regulated to run deep or shallow, as may be desired by the operator.

The plow $g$ may be removed and another substituted if necessary.

This plow can be operated without difficulty by a boy. It is simple in construction, light, and at the same time particularly adapted for light gardening purposes, for which it is intended.

Having thus fully described my invention, what I claim as new, and desire to secure by Letters Patent, is—

1. In a garden-cultivator, the frame A, slotted arm $d$, journaled at $d'$, clevis $e$, standard $f$, with plow $g$, slotted arm $e'$, and wheels $b\ c$, all constructed, arranged, and adapted to operate substantially as herein set forth.

2. The combination of the frame A, having slotted arm $d$, fulcrumed clevis $d^2$, rear adjustable slotted arm $e'$, handles $h\ h$, adjusted at $h^2$ to lower or raise said handles, all constructed and operating as and for the purpose herein set forth.

In testimony whereof I affix my signature in presence of two witnesses.

EMILE RUDOLPH MILTENBERGER.

Witnesses:
J. P. BAKER,
T. J. BROWNSON.